Patented Dec. 6, 1927.

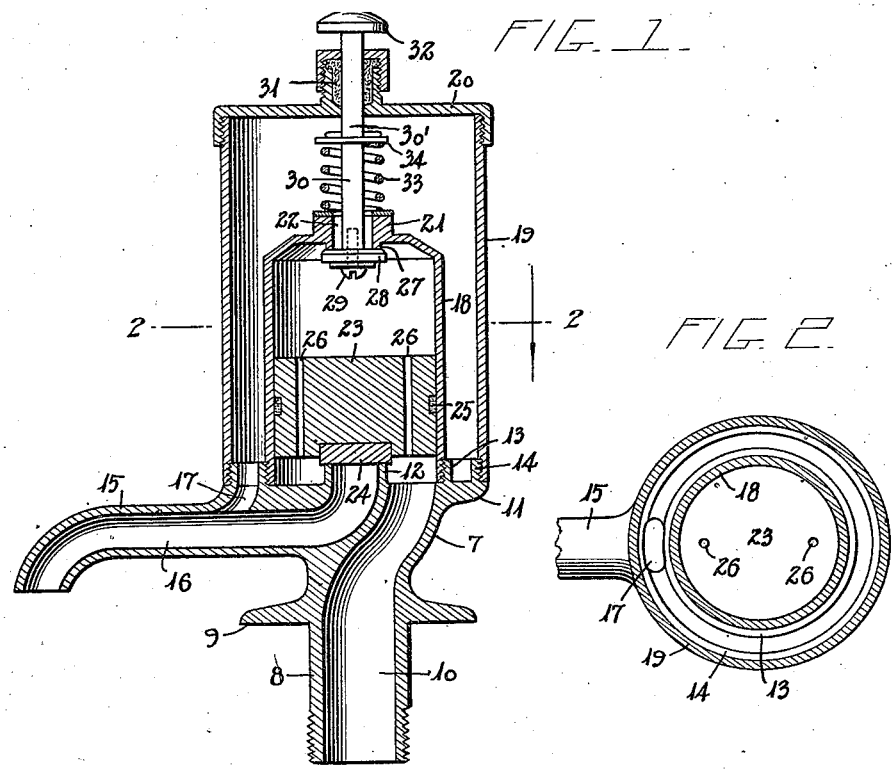

1,651,689

UNITED STATES PATENT OFFICE.

OTIS A. FREEZE, OF JOLIET, ILLINOIS.

PRESSURE-OPERATED VALVE.

Application filed March 17, 1926. Serial No. 95,292.

The present invention relates to valves and aims to provide a novel and improved valve construction wherein the flow of the water or other pressure fluid is established and shut off by the pressure of the fluid under manual control, in order that the flow may be readily and conveniently controlled with little effort, thereby relieving the operator of the labor in operating the valve, to either open or close it, against the fluid pressure.

Another object is the provision of such a valve construction comprising a novel arrangement and assembly of the component elements whereby the device is practical and efficient in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a vertical median section of a faucet type construction of valve embodying the present invention, portions being shown in elevation and the valve being shown closed.

Fig. 2 is a horizontal section on the line 2—2 of Fig. 1.

In the embodiment of the invention as shown, there is provided a metal base 7 having the depending nipple 8 to extend down through the top of a wash basin, or the like, and provided with a surrounding flange 9 to seat on said top or support. The base 7 has an entrance passage 10 leading upwardly from the lower end of the nipple 8 to the surface of an upper disk portion 11 of the base 7. The portion 11 has a central upstanding stud 12 forming a valve seat, and said portion 11 has upstanding annular flanges 13 and 14 concentric with the stud or valve seat 12. The base 7 also has a nozzle 15 outstanding therefrom provided within the discharge passage 16 opening upwardly within the stud or valve seat 12. A drain aperture or port 17 is formed in the portion 11 of the base and leads downwardly from between the flanges 13 and 14 to the discharge passage 16.

An upstanding cylinder 18 has its lower end screw-threaded within the flange 13, and a cylinder 19 of larger diameter and greater height is screw-threaded on the flange 14, thereby providing an annular space between said cylinders from the lower end of which the aperture or port 17 leads to the passage 16. A cap 20 is screw-threaded on the upper end of the cylinder 19 to close same, and the upper end of the cylinder 18 has a boss 21 of reduced diameter and provided with a port or opening 22 establishing communication between the space between the cylinders and the space within the cylinder 18.

A piston 23 is slidable in the cylinder 18 for vertical movement, and a valve disk 24 of suitable material is inset into the lower portion of the piston to seat on the valve seat 12 for closing the valve, as seen in Fig. 1. The piston 23 has a packing ring 25 thereon to engage the cylinder 18, and said piston has passages 26 extending therethrough between the top and bottom surfaces thereof and located between the periphery of the piston and the valve disk or member 24. The passages 26 establish communication between the upper and lower chambers of the cylinder 18.

The upper end of the cylinder 18 has a downwardly facing valve seat 27 surrounding the opening 22, and against which a valve disk or head 28 is seatable from below. The valve disk 28 is secured to the lower end of a stem or rod 30, by means of a screw 29 or otherwise, and a plunger 30' passes slidably through the cap 20' which has suitable packing 31 to prevent leakage. The plunger 30' has a button 32 at its upper end which may be conveniently depressed to depress the stem 30 and unseat the valve disk 28. A coiled spring 33 surrounds the stem 30 and is confined between the boss 21 and a washer or collar 34 on the upper end of the stem 30, thereby normally raising the valve disk 28 to seat same across the opening 22. The lower end of the plunger 30' contacts with the upper end of the stem 30 and collar 34.

With the valve disk 28 seated, as seen in Fig. 1, the fluid flowing upwardly through the passage 26 will build up a pressure above the piston 23, which assisted by the gravity of the piston 23, will move said piston downwardly and seat the valve disk or member 24, thereby shutting off communication between the inlet passage 10 and discharge passage 16, so that the valve is closed. By touching or depressing the button 32, which requires very slight effort, the valve disk 28 is unseated, so that the fluid within the cylinder 18 above the piston 23 may flow through the opening 22 and down the space between the cylinders 18 and 19, so as to drain through the opening or aperture 17 into the discharge passage 16. The pressure of the fluid upwardly against the piston 23 from below will immediately force said piston upwardly, thereby discharging the fluid from above the piston through the opening 22, and the valve disk or member 24 being raised from the seat 12 will immediately establish the flow of the fluid from the passage 10 into and through the passage 16. The flow will continue as long as the button 32 is held down, and as soon as the button 32 is released, the spring 33 will raise the stem 30 and seat the valve disk 28. The fluid flowing through the passages 26 will build up the pressure in the cylinder 18 above the piston, so that said piston is gradually moved downwardly by the preponderance of pressure above the piston, and the valve disk or member 24 will therefore be moved over the discharge or outlet passage 16, to close the valve automatically by the fluid pressure. Thus, by controlling the secondary valve disk or member 28 the main valve disk or member 24 is operated by fluid pressure to either open or close the valve.

Having thus described the invention, what is claimed as new is:—

A valve structure of the character described comprising a base having inlet and discharge passages, a cylinder having an open end detachably connected to said base with said passages communicating therewith, a piston slidable in said cylinder and having a valve portion to seat across the discharge passage and having a passage therethrough, said cylinder having an opening at that end opposite to the base, a stem extending through said opening and having a valve member within the cylinder to seat across said opening and having a collar on the exterior of said cylinder, a spring confined between said collar and cylinder to normally seat said valve member, a second cylinder detachably connected to said base and enclosing the first-named cylinder, said base having a port establishing communication between the discharge passage and the space between said cylinders, and a plunger slidable in the second cylinder and adapted to contact with said stem.

In testimony whereof I hereunto affix my signature.

OTIS A. FREEZE.